(12) United States Patent
Keshavdas et al.

(10) Patent No.: US 12,710,813 B2
(45) Date of Patent: Aug. 18, 2026

(54) EYE TRACKING SYSTEM AND METHODS OF USING AN EYE TRACKING SYSTEM

(71) Applicant: TOBII AB, Danderyd (SE)

(72) Inventors: Shanker Keshavdas, Danderyd (SE); Rickard Lundahl, Danderyd (SE); Pravin Kumar Rana, Danderyd (SE); Neda Zamani, Danderyd (SE)

(73) Assignee: TOBII AB, Danderyd (SE)

( * ) Notice: Subject to any disclaimer, the term of this patent is extended or adjusted under 35 U.S.C. 154(b) by 232 days.

(21) Appl. No.: 18/762,735

(22) Filed: Jul. 3, 2024

(65) Prior Publication Data

US 2025/0013299 A1 Jan. 9, 2025

(30) Foreign Application Priority Data

Jul. 5, 2023 (SE) .................................. 2350840-1

(51) Int. Cl.
*G06F 3/01* (2006.01)
*G06T 7/80* (2017.01)

(52) U.S. Cl.
CPC ................ *G06F 3/013* (2013.01); *G06T 7/80* (2017.01); *G06T 2207/20076* (2013.01); *G06T 2207/30196* (2013.01)

(58) Field of Classification Search
CPC ...... G06F 3/013; G02B 27/0093; A61B 3/113
See application file for complete search history.

(56) References Cited

U.S. PATENT DOCUMENTS 1,170,521 A 2/1916 Faison
7,742,623 B1 6/2010 Moon et al.
9,070,017 B2 * 6/2015 Hennessey .............. G06F 3/013
9,529,191 B2 * 12/2016 Sverdrup ........... G02B 27/0093
(Continued)

FOREIGN PATENT DOCUMENTS

EP 3637169 A1 4/2020
EP 3739432 A1 11/2020
(Continued)

OTHER PUBLICATIONS

Swedish Search Report for Application No. 2350840-1, completed on Feb. 9, 2024.

*Primary Examiner* — Christopher Stanford
(74) *Attorney, Agent, or Firm* — Christopher Ignatius Moylan

(57) ABSTRACT

A method for determining a gaze convergence distance for a user of an eye tracking system. The method involves identifying a plurality of candidate convergence points along a combined gaze vector; and for each candidate convergence point, calculating a probability that the candidate convergence point is at the gaze convergence distance based on: a) the angle between a left gaze vector and a line from a left eye origin through the candidate convergence point; b) the angle between a right gaze vector and a line from a right eye origin through the candidate convergence point; c) the distance between the left gaze vector and the candidate convergence point; and d) the distance between the right gaze vector and the candidate convergence point. The method then involves calculating the gaze convergence distance based on the candidate convergence point that has the highest probability.

20 Claims, 8 Drawing Sheets

(56) References Cited

U.S. PATENT DOCUMENTS

| | | | | |
|---|---|---|---|---|
| 9,880,384 | B2 * | 1/2018 | Wilson | A61B 3/113 |
| 9,940,518 | B1 * | 4/2018 | Klingström | G06V 40/193 |
| 9,984,507 | B2 * | 5/2018 | Aksoy | G02B 27/017 |
| 10,627,901 | B2 * | 4/2020 | Raskar | G02B 27/0172 |
| 10,755,096 | B2 * | 8/2020 | Zhang | G06F 3/013 |
| 10,917,634 | B2 * | 2/2021 | Edwin | G02B 27/0081 |
| 12,056,276 | B1 * | 8/2024 | Chapiro | G06F 3/011 |
| 2015/0003819 | A1 | 1/2015 | Ackerman et al. | |
| 2019/0213382 | A1 | 7/2019 | Zhang et al. | |
| 2019/0369719 | A1 | 12/2019 | Klingström et al. | |
| 2020/0257360 | A1 | 8/2020 | Klingström et al. | |
| 2020/0372677 | A1 | 11/2020 | Yoon et al. | |
| 2021/0208403 | A1 | 7/2021 | Andersson | |
| 2021/0286427 | A1 | 9/2021 | Pateriya | |
| 2021/0287443 | A1 | 9/2021 | Pateriya | |
| 2023/0105302 | A1 * | 4/2023 | Tornéus | G02B 27/0093<br>351/209 |

FOREIGN PATENT DOCUMENTS

| | | | |
|---|---|---|---|
| KR | 20220073621 | A | 6/2022 |
| SE | 1950758 | A1 | 10/2020 |

* cited by examiner 438a
438b
442a
442b
441
439a
439b
440 probability
6.5
6.4
6.3
6.2
6.1
100
200
300
400
500
600
700
distance (mm)
770
771
772
773
774
775

EYE TRACKING SYSTEM AND METHODS OF USING AN EYE TRACKING SYSTEM

CROSS-REFERENCE TO RELATED APPLICATION

The present application claims priority to Swedish patent application No. 2350840-1, filed 5 Jul. 2023, entitled "An Eye Tracking System and Methods of Using an Eye Tracking System," and is hereby incorporated by reference in its entirety.

FIELD

The present disclosure generally relates to the field of eye tracking. In particular, the present disclosure relates to methods and systems for determining a gaze convergence distance for a user of an eye tracking system.

BACKGROUND

In eye tracking applications, digital images are retrieved of the eyes of a user and the digital images are analysed in order to estimate gaze direction of the user. The estimation of the gaze direction may be based on computer-based image analysis of features of the imaged eye. One known example method of eye tracking includes the use of near-infrared light and an image sensor. The near-infrared light is directed towards eye(s) of a user and the reflection of the light is captured by an image sensor.

Portable or wearable eye tracking devices have been previously described. One such eye tracking system is described in U.S. Pat. No. 9,041,787 and PCT patent publication number WO 2019/158709 (which are hereby incorporated by reference in their entirety). A wearable eye tracking device is described using illuminators and cameras for determining gaze direction.

SUMMARY

According to a first aspect of the disclosure, there is provided a method for determining a gaze convergence distance for a user of an eye tracking system, the method comprising:

receiving:

- a left gaze signal, which represents a left gaze vector from a left eye origin;
- a right gaze signal, which represents a right gaze vector from a right eye origin;
- a combined gaze signal, which represents a determined combined gaze vector;

identifying a plurality of candidate convergence points along the combined gaze vector;

for each candidate convergence point, calculating a probability that the candidate convergence point is at the gaze convergence distance based on:

- a) the angle between the left gaze vector and a line from the left eye origin through the candidate convergence point;
- b) the angle between the right gaze vector and a line from the right eye origin through the candidate convergence point;
- c) the distance between the left gaze vector and the candidate convergence point; and
- d) the distance between the right gaze vector and the candidate convergence point; and calculating the gaze convergence distance based on the candidate convergence point that has the highest probability.

Advantageously, such a method can improve the accuracy with which the gaze convergence distance of the user's eyes can be determined. This can be achieved by leveraging the accuracy of the combined gaze signal by assuming that the convergence corresponds to a point on the combined gaze vector.

Calculating the probability that each candidate convergence point is at the gaze convergence may be based on:

- a) the application of a probability distribution function to the angle between the left gaze vector and a line from the left eye origin through the candidate convergence point; and
- b) the application of a probability distribution function to the angle between the right gaze vector and a line from the right eye origin through the candidate convergence point.

Calculating the probability that each candidate convergence point is at the gaze convergence many be based on:

- a) the application of one of the following probability distribution functions to the angle between the left gaze vector and a line from the left eye origin through the candidate convergence point: a monotonically decreasing function, a normal distribution function, and a directional distribution function such as a von Mises function; and
- b) the application of one of the following probability distribution functions to the angle between the right gaze vector and a line from the right eye origin through the candidate convergence point: a monotonically decreasing function, a normal distribution function, and a von Mises function.

Calculating the probability that each candidate convergence point is at the gaze convergence may be based on:

- a) the application of a three-dimensional probability distribution function to the angle between the left gaze vector and a line from the left eye origin through the candidate convergence point; and
- b) the application of a three-dimensional probability distribution function to the angle between the right gaze vector and a line from the right eye origin through the candidate convergence point.

Calculating the probability that each candidate convergence point is at the gaze convergence may be based on:

- c) the application of a probability distribution function to the distance between the left gaze vector and the candidate convergence point; and
- d) the application of a probability distribution function to the distance between the right gaze vector and the candidate convergence point.

Calculating the probability that each candidate convergence point is at the gaze convergence may be based on:

- c) the application of a monotonically decreasing probability distribution function to the distance between the left gaze vector and the candidate convergence point; and
- d) the application of a monotonically decreasing probability distribution function to the distance between the right gaze vector and the candidate convergence point.

The monotonically decreasing function that is applied for the left gaze vector may be an exponential function raised to the power of d, where d is distance between the left gaze vector and the candidate convergence point. The monotonically decreasing function that is applied for the right gaze vector may be an exponential function raised to the power of d, where d is distance between the right gaze vector and the candidate convergence point.

Calculating the probability that each candidate convergence point is at the gaze convergence may be based on:

c) a Euclidian or a Minkowski/Manhattan distance between the left gaze vector and the candidate convergence point; and d) a Euclidian or a Minkowski/Manhattan distance between the right gaze vector and the candidate convergence point.

The method may further comprise:

using the determined gaze convergence distance to control the focal length of a varifocal lens of the eye tracking system.

The method may further comprise:

presenting a plurality of selectable objects to the user on one or more display screens, wherein each of the plurality of selectable objects is at a known object distance from the user and is at a known location on the on one or more display screens;

determining a gaze angle for the user at the same time as images of the user's left and right eyes are captured; and using the calculated gaze convergence distance in combination with the determined gaze angle to identify one of the selectable objects as a selected object.

The method may further comprise, prior to receiving the combined gaze signal, the left gaze signal, and the right gaze signal:

presenting a plurality of calibration objects to the user on one or more display screens, wherein the plurality of calibration objects is at known locations on the one or more display screens;

while the plurality of calibration objects is being presented:

capturing calibration images of the user's left eye and determining calibration left gaze signals that each represent a left gaze vector and a left eye origin for the user's left eye based on the captured calibration images of the user's left eye;

capturing calibration images of the user's right eye and determining calibration right gaze signals that each represent a right gaze vector and a right eye origin for the user's right eye based on the captured calibration images of the user's right eye;

determining:

one or more parameters of a probability distribution function (e.g. the mean direction and the concentration parameter of a von Mises distribution) for the user's left eye based on pairs of: i) a determined calibration left gaze signal; and ii) the known location of the calibration object that is displayed on the one or more display screens at the same time that the calibration image associated with the determined calibration left gaze signal was captured; and one or more parameters of a probability distribution function for the user's right eye based on pairs of: i) a determined calibration right gaze signal; and ii) the known location of the calibration object that is displayed on the one or more display screens at the same time that the calibration image associated with the determined calibration right gaze signal was captured.

There is also disclosed an eye tracking system that is configured to perform any method disclosed herein.

The eye tracking system may be a head-mounted eye tracking system.

The eye tracking system may be an extended reality system.

There may be provided a computer program, which when run on a computer, causes the computer to configure any apparatus, including a controller, device or system disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device or may be embodied as a transient signal. Such a transient signal may be a network download, including an internet download. There may be provided one or more non-transitory computer-readable storage media storing computer-executable instructions that, when executed by a computing system, causes the computing system to perform any method disclosed herein.

BRIEF DESCRIPTION OF THE DRAWINGS

One or more embodiments will now be described by way of example only with reference to the accompanying drawings in which.

DETAILED DESCRIPTION

Figure 1:
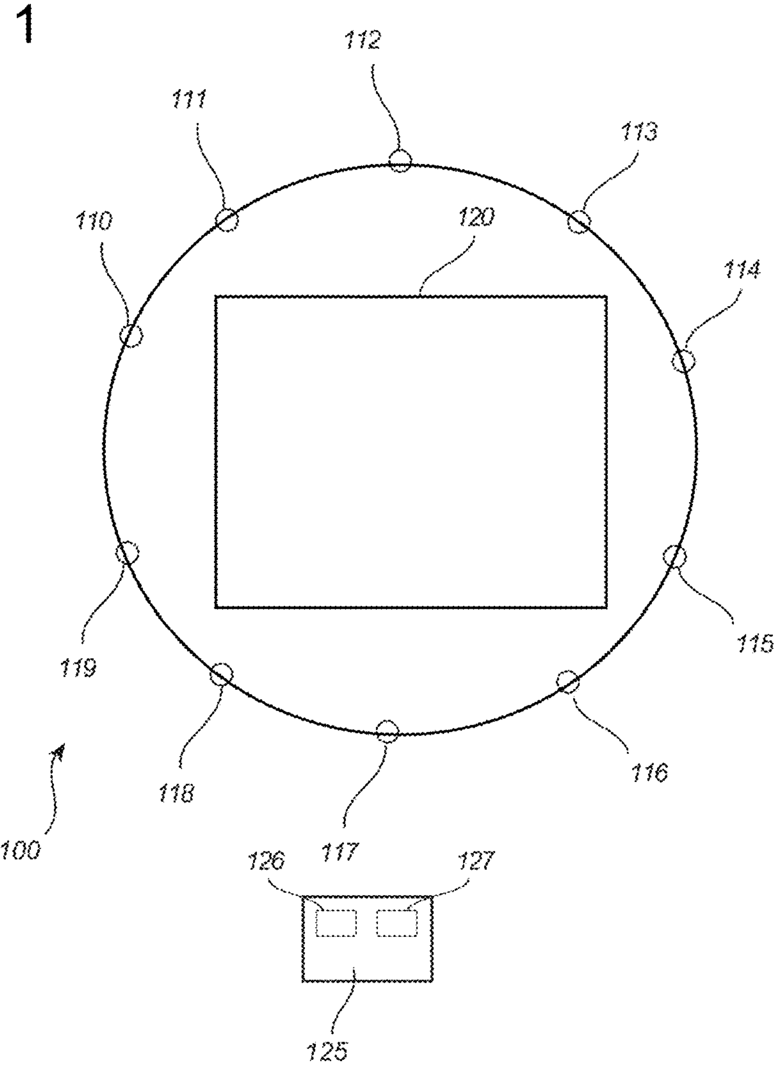
FIG. 1 shows a simplified view of an eye tracking system in a head-mounted device.

FIG. 1 shows a simplified view of an eye tracking system 100 (which may also be referred to as a gaze tracking system) in a head-mounted device in the form of a virtual or augmented reality (VR or AR) device or VR or AR glasses or anything related, such as extended reality (XR) or mixed reality (MR) headsets. The system 100 comprises an image sensor 120 (e.g., a camera) for capturing images of the eyes of the user. The system may optionally include one or more illuminators 110-119 (also referred to herein as light sources) for illuminating the eyes of a user, which may for example be light emitting diodes (LEDs) emitting light in the infrared frequency band, or in the near infrared frequency band and which may be physically arranged in a variety of configurations. The image sensor 120 may for example be an image sensor of any type, such as a complementary metal oxide semiconductor (CMOS) image sensor or a charged coupled device (CCD) image sensor. The image sensor may consist of an integrated circuit containing an array of pixel sensors, each pixel containing a photodetector and an active amplifier. The image sensor may be capable of converting light into digital signals. In one or more examples, it could be an infrared image sensor or IR image sensor, an RGB sensor, an RGBW sensor or an RGB or RGBW sensor with IR filter.

The eye tracking system 100 may comprise circuitry or one or more controllers 125, for example including a receiver 126 and processing circuitry 127, for receiving and processing the images captured by the image sensor 120. The circuitry 125 may for example be connected to the image sensor 120 and the optional one or more illuminators 110-119 via a wired or a wireless connection and be co-located with the image sensor 120 and the one or more illuminators 110-119 or located at a distance, e.g., in a different device. In another example, the circuitry 125 may be provided in one or more stacked layers below the light sensitive surface of the light sensor 120.

The eye tracking system 100 may include a display (not shown) for presenting information and/or visual stimuli to the user. The display may comprise a VR display which presents imagery and substantially blocks the user's view of the real-world or an AR display which presents imagery that is to be perceived as overlaid over the user's view of the real-world.

The location of the image sensor 120 for one eye in such a system 100 is generally away from the line of sight for the user in order not to obscure the display for that eye. This configuration may be, for example, enabled by means of so-called hot mirrors which reflect a portion of the light and allows the rest of the light to pass, e.g., infrared light is reflected, and visible light is allowed to pass.

While in the above example the images of the user's eye are captured by a head-mounted image sensor 120, in other examples the images may be captured by an image sensor that is not head-mounted. Such a non-head-mounted system may be referred to as a remote system.

Figure 2:
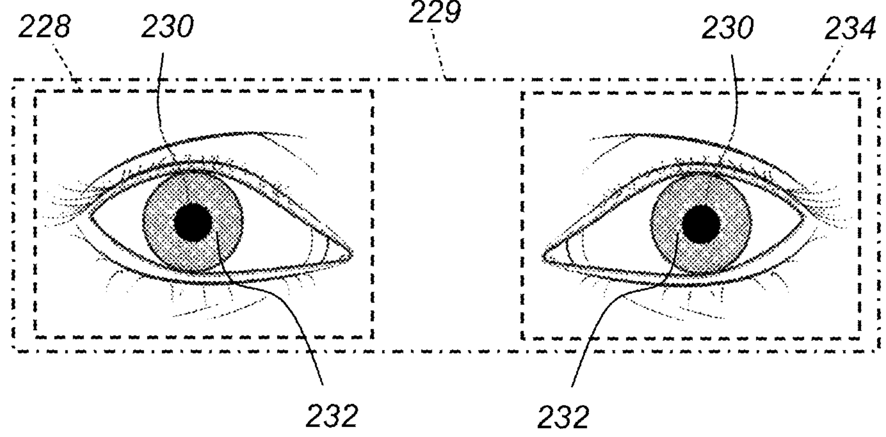
FIG. 2 shows a simplified example of an image of a pair of eyes, captured by an eye tracking system such as the system of FIG. 1.

FIG. 2 shows a simplified example of an image 229 of a pair of eyes, captured by an eye tracking system such as the system of FIG. 1. The image 229 can be considered as including a right-eye-image 228, of a person's right eye, and a left-eye-image 234, of the person's left eye. In this example the right-eye-image 228 and the left-eye-image 234 are both parts of a larger image of both of the person's eyes. In other examples, separate image sensors may be used to acquire the right-eye-image 228 and the left-eye-image 234. In further still examples, multiple image sensors may be used to acquire images capturing both eyes.

The system may employ image processing (such as digital image processing) for extracting features in the image. The system may for example identify a position of the pupil 230 in the one or more images captured by the image sensor. The system may determine the position of the pupil 230 using a pupil detection process. The system may also identify corneal reflections (also known as glints) 232 located in close proximity to the pupil 230. The system may estimate a corneal centre and/or a distance to the user's eye based on the corneal reflections 232. For example, the system may match each of the individual corneal reflections 232 for each eye with a corresponding illuminator and determine the corneal centre of each eye and/or the distance to the user's eye based on the matching. To a first approximation, the eye tracking system may determine an optical axis of the eye of the user as the vector passing through a centre of the pupil 230 and the corneal centre. The direction of gaze corresponds to the axis from the fovea of the eye through the corneal centre (visual axis). The angle between the optical axis and the gaze direction is the foveal offset, which typically varies from user to user and is in the range of a few degrees. The eye tracking system may perform a calibration procedure, instructing the user to gaze in a series of predetermined directions (e.g., via instructions on a screen), to determine the fovea offset. The determination of the optical axis described above is known to those skilled in the art and often referred to as pupil centre corneal reflection (PCCR). PCCR is not discussed in further detail here.

Figures 3, 4:
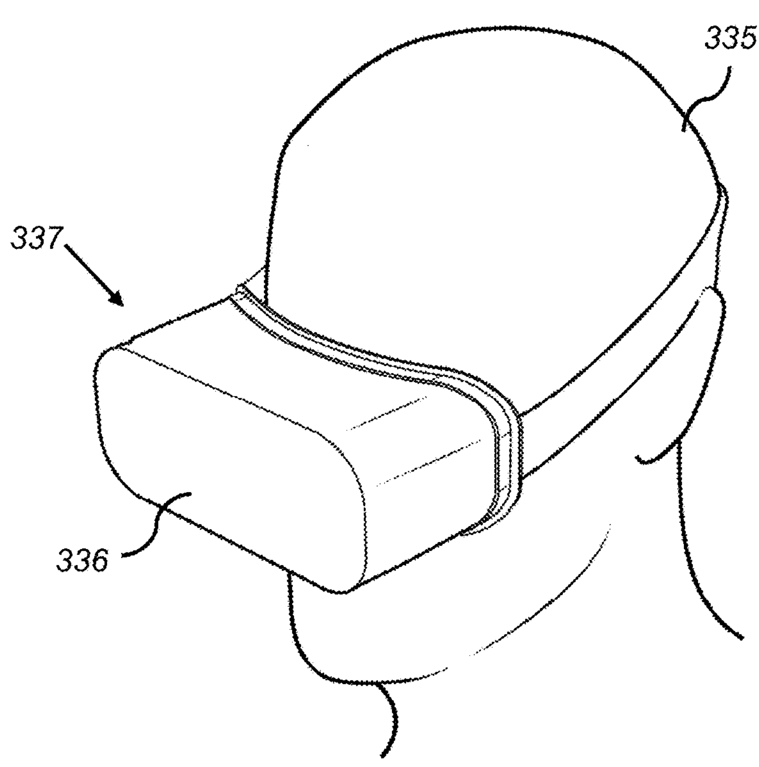
FIG. 3 shows a head-mounted device that is mounted on the head of a user.
FIG. 4 illustrates various properties associated with a user's eyes when they are looking at an object.

FIG. 3 shows a head-mounted device 337 that is mounted on the head of a user 335. The head-mounted device 337 in this example is an extended reality (XR) headset. XR headsets include virtual reality (VR) headsets, augmented reality (AR) headsets and mixed reality (MR) headsets. The head-mounted device 337 includes a 3-dimensional (3D) display screen 336 that is able to visualize objects that appear to be at certain distances from the user in response to a control signal received from a computer. The head-mounted device 337 can often also determine a gaze angle using one or more gaze tracking sensors, as is known in the art.

The 3D display screen 336 may for example be a stereoscopic display screen. Alternatively, the 3D display screen 336 may be a volumetric 3D display screen, being either autostereoscopic or automultiscopic. This indicates that they may create 3D imagery visible to an unaided eye, without requiring stereo goggles or stereo head-mounted displays. Consequently, various of the eye tracking systems that are described herein can be provided as either a head mounted device or a remote system that does not require stereo goggles or stereo head-mounted displays. In a further example, the 3D display screen can be a remote display screen where stereoscopic glasses are needed to visualize the 3D effect to the user.

FIG. 4 illustrates various properties associated with a user's eyes when they are looking at an object, which will be referred to below.

In FIG. 4, the user's right eye 442*a* and the user's left eye 442*b* are shown. A right gaze vector 439*a* is shown for the user's right eye 442*a*, which originates from the centre of the user's right pupil 438*a* (which can also be referred to as a right eye origin). A left gaze vector 439*b* is shown for the user's left eye 442*b*, which originates from the centre of the user's left pupil 438*b* (which can also be referred to as a left eye origin). A convergence point 440 can be determined as the point of intersection of the gaze vectors 439*a*, 439*b* from each eye. A gaze convergence distance is the distance between the user and the convergence point 440. The gaze convergence distance can be calculated as the distance from the left eye 442*b* to the convergence point 440 (i.e. along the left gaze vector 439*b* for the left eye 442*b*), or it can be calculated as the distance from the right eye 442*a* to the convergence point 440 (i.e. along the right gaze vector 439*a* for the right eye 442*a*), or it can be calculated as the distance 441 from a normal between the left eye 442*b* and the right eye 442*a* to the convergence point 440.

For a VR headset such as the one of FIG. 3, the gaze convergence distance can be defined as the distance between the system origin of the VR headset and the intersection of the left and right gaze vectors 439*a*, 439*b*. Two vectors in 3D space only intersect if they are on the same plane, and the probability that two vectors in 3D space intersect in practice is very small. Therefore, one way of determining the intersection point of two vectors in 3D space is to compute the point between two vectors where the two vectors are closest. However, this approach is susceptible to noise in the determination of the gaze origin (the cornea centre).

A stereoscopic scene in a VR headset is rendered at a fixed depth (focal plane) away from the eyes. If the eyes' vergence at that time is not at the same position as the focal plane, the user may experience blurring when looking at different objects in the scene. This phenomenon is the so-called vergence-accommodation conflict problem.

In addition to the focusing problem, vergence accommodation conflict can also cause visual fatigue and eye strain.

As will be discussed in detail below, examples disclosed herein can provide an improved method of determining the vergence distance of the user's eyes. The determined vergence distance can then be used to automatically adjust a varifocal VR headset to set the correct focal plane of the stereoscopic scene for the user.

Figure 5A:
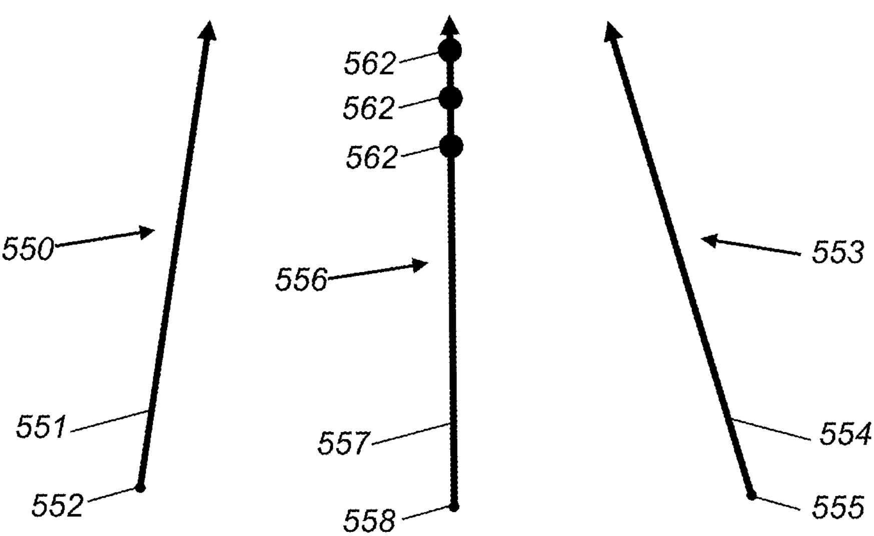
FIG. 5*a* illustrates schematically a representation of the following signals that can be provided by an eye tracking system: a left gaze signal, a right gaze signal and a combined gaze signal.
Figure 5B:
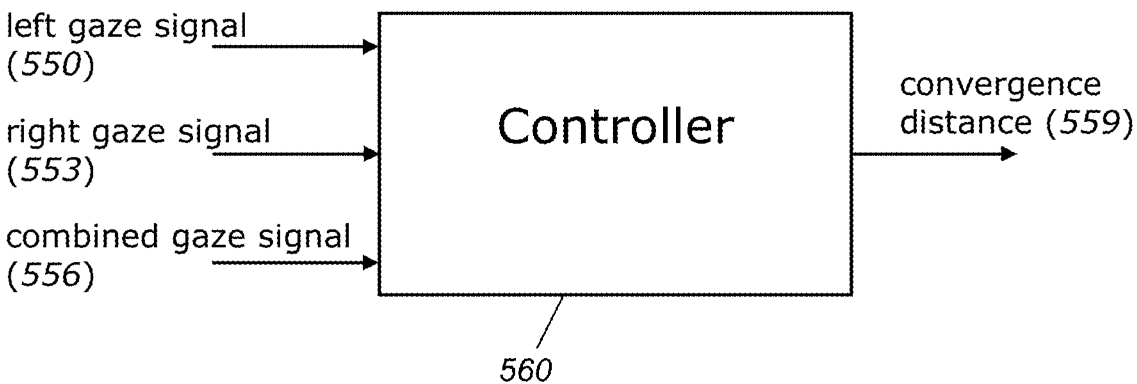
FIG. 5*b* illustrates an example embodiment of a controller, which can be part of an eye tracking system, that processes a left gaze signal, a right gaze signal and a combined gaze signal in order to calculate the user's gaze convergence distance.

FIG. 5*a* illustrates schematically a representation of the following signals that can be provided by an eye tracking system: a left gaze signal 550, a right gaze signal 553 and a combined gaze signal 556. FIG. 5*b* illustrates an example embodiment of a controller 560, which can be part of an eye tracking system, that processes the left gaze signal 550, the right gaze signal 553 and the combined gaze signal 556 in order to calculate the user's gaze convergence distance 559.

The left gaze signal 550 represents a left gaze vector 551 from a left eye origin 552. The right gaze signal 553 represents a right gaze vector 554 from a right eye origin 555. The combined gaze signal 556 represents a combined gaze vector 557 from a combined origin 558. One or more of the gaze vectors and signals described herein may be provided by the eye tracking system as an output signal that represents the direction of the user's gaze.

Eye tracking systems that are well known in the art can provide the left gaze signal 550 and the right gaze signal 553. Also, eye tracking systems are known that can combine the left gaze signal 550 with the right gaze signal 553 to provide the combined gaze signal 556. The combination of the left and right gaze signals 550, 553 can result in a low-noise combined gaze signal 556. For example, the combined gaze signal 556 can be a weighted combination of the left and right gaze signals 550, 553. The weights can be computed by estimating the noise in the gaze computation algorithm for each side (left/right). It has been found through testing that such a combined gaze signal 556 has a high degree of accuracy. As will be discussed below, examples of the present disclosure can leverage the accuracy of this combined gaze signal 556 by assuming that the convergence point lies on the combined gaze vector 557.

The controller 560 of FIG. 5*b* identifies a plurality of candidate convergence points 562 along the combined gaze vector 557. The controller 560 will perform processing for each of these candidate convergence points 562 to determine if it should be identified as corresponding to the convergence distance for the user. As will be appreciated from the description that follows, there may be a finite number of candidate convergence points 562 (as shown in FIG. 5*a*) or a continuous function may be applied along the combined gaze vector 557. The application of such a continuous function can be considered as identifying an infinite number of candidate convergence points 562. The selection finite number of candidate convergence points 562 may be performed in any suitable way, such as at regular intervals between two end candidate convergence points. The end candidate convergence points can be predefined for a given application, they can be fixed values for any application, or they can be set in any other way.

For each candidate convergence point 562, the controller 560 calculates a probability that the candidate convergence point 562 is at the gaze convergence distance. The controller 560 calculates the probability for each candidate convergence point 562 based on:

a) the angle between the left gaze vector 551 and a line from the left eye origin 552 through the candidate convergence point 562;
b) the angle between the right gaze vector 554 and a line from the right eye origin 555 through the candidate convergence point 562;
c) the distance between the left gaze vector 551 and the candidate convergence point 562; and
d) the distance between the right gaze vector 554 and the candidate convergence point 562.

The controller 560 can determine each of these probabilities by applying a probability distribution function.

Figure 5C:
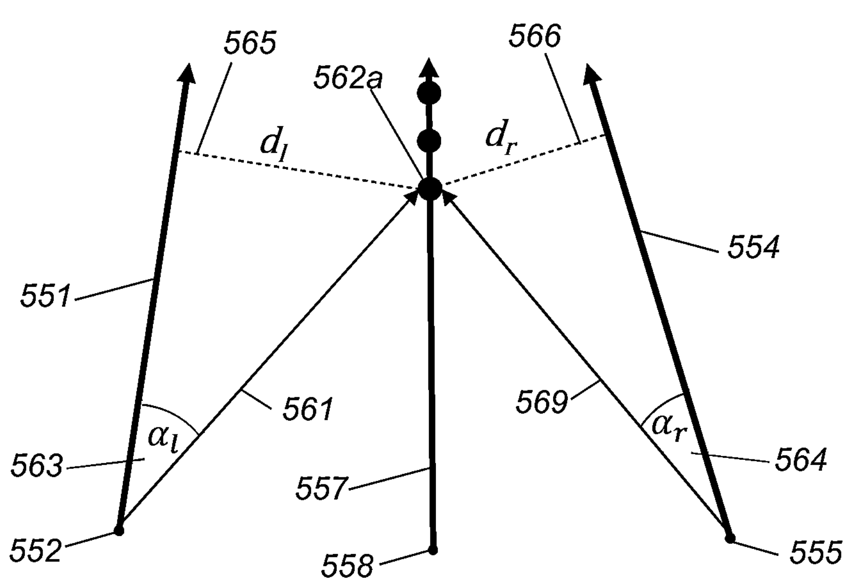
FIG. 5*c* shows various parameters that are used for calculating the probability for a specific one of the candidate convergence points.

FIG. 5*c* shows the following parameters that are used for calculating the probability for a specific one 562*a* of the candidate convergence points:

a) the angle 563 between the left gaze vector 551 and a line 561 from the left eye origin 552 through the candidate convergence point 562*a;*
b) the angle 564 between the right gaze vector 554 and a line 569 from the right eye origin 555 through the candidate convergence point 562*a;*
c) the distance 565 between the left gaze vector 551 and the candidate convergence point 562*a*; and
d) the distance 566 between the right gaze vector 554 and the candidate convergence point 562*a*.

In FIG. 5*c*, the distances 565, 566 between the left and right gaze vectors 551, 554 and the candidate convergence point 562*a* are the shortest distances between the candidate convergence point 562*a* and any point on the associated gaze vector 551, 554. However, it will be appreciated that in other examples the shortest distance does not need to be used, as long as a consistent measure of the distance between the left and right gaze vectors 551, 554 and the candidate convergence point 562*a* is used. Therefore, a Euclidian or a Minkowski/Manhattan distance between the candidate convergence point 562 and the respective left and right gaze vectors 551, 554 can be used.

Once the controller 560 has calculated the probabilities for the candidate convergence points 562, it can calculate the gaze convergence distance 559 based on the candidate convergence point 562 that has the highest probability of the probabilities for each of the candidate convergence points 562.

It has been found that calculating the gaze convergence distance 559 in this way results in an accurate value for the gaze convergence distance 559. This is because the high accuracy of the combined gaze signal 556 can be leveraged such that the gaze convergence distance 559 can be accurately calculated in a computationally efficient way.

We will now work through an example of the calculations that can be performed by the controller 560 of FIG. 5*b* in more detail, with reference to the candidate convergence point 562*a* that is shown in FIG. 5*c*.

The controller 560 determines probabilistic distributions around each per-eye gaze vector 551, 554. These probabilistic distributions can be considered as rays 561, 569 emanating from the per-eye gaze origins 552, 555, where the angles 563, 564 between the rays 561, 569 and the per-eye gaze directions 551, 554 contribute to the probability of the actual convergence point lying on that specific ray 561, 569. The higher the angle 563, 564, the more the candidate convergence point deviates from the associated gaze direction 551, 554, and therefore the lower the probability that the candidate convergence point is the actual convergence point.

In FIG. 5*c*, the following are known:

1. The left 552, the right 555 and the combined 558 gaze origins.
2. The left 551, the right 554 and the combined 557 gaze vectors.

The candidate convergence point 562*a* under consideration is P. Let the individual probabilities for P being the actual convergence point for the per-side probability distributions be $f_l(P)$ and $f_r(P)$. Let the joint probability of P being the convergence point for both sides be f(P).

We consider that the individual probability distributions are independent of each other, thus we compute the joint probability distribution as $$f(P) = f_l(P) * f_r(P)$$

As indicated above, the individual probability distributions are based on angle deviations from the individual gaze vectors. The angle deviation 563 for the left gaze vector 551 is $\alpha_l$. The angle deviation 564 for the right gaze vector 551 is $\alpha_r$. Substituting these into the above equation we get, $$f(P) = f_l(\alpha_l) * f_r(\alpha_r)$$

One way of modeling the probability distribution based on angle is by modelling the gaze distribution for a user during a calibration procedure. That is, one or more parameters of a probability distribution function can be calibrated for a user prior to receiving the combined gaze signal 556, the left gaze signal 550, and the right gaze signal 553.

Such a calibration procedure can involve a plurality of calibration objects (also known as stimuli points) being presented to the user on one or more display screens, wherein the plurality of calibration objects is at known locations on the one or more display screens. While the plurality of calibration objects is being presented: calibration images of the user's left eye are captured such that a controller can determine calibration left gaze signals that each represent a left gaze vector and a left eye origin for the user's left eye based on the captured calibration images of the user's left eye. Also, while the plurality of calibration objects is being presented: calibration images of the user's right eye can be captured such that the controller can determine calibration right gaze signals that each represent a right gaze vector and a right eye origin for the user's right eye based on the captured calibration images of the user's right eye. In this way, gaze direction samples can be collected for each stimulus point such that the controller can model how the gaze direction samples are distributed around the ground truth gaze direction.

The controller can then determine one or more parameters of the probability distribution function for the user's left eye based on pairs of: i) a determined calibration left gaze signal; and ii) the known location of the calibration object that is displayed on the one or more display screens at the same time that the calibration image associated with the determined calibration left gaze signal was captured. The controller can also determine one or more parameters of a probability distribution function for the user's right eye based on pairs of: i) a determined calibration right gaze signal; and ii) the known location of the calibration object that is displayed on the one or more display screens at the same time that the calibration image associated with the determined calibration right gaze signal was captured. In one example, which will be described below, the parameters can be a mean direction and a concentration parameter of a von Mises distribution function.

The gaze direction distribution can be modelled using a directional distribution such as the von Mises distribution, by:

1. Collecting samples over a period of time during the calibration procedure and normalizing the associated gaze angles.
2. Computing sample mean and variance. The mean direction of the von Mises distribution will correspond to the sample mean, and the concentration parameter of the von Mises distribution will correspond to the sample variance.
3. Once these two parameters are determined, drawing samples from a von Mises distribution with the computed mean direction and the concentration parameter. Samples can be drawn for each of the data points of the target data.
4. Performing a two-sample Kolmogorov-Smirnov test between samples from the target data and samples collected from the von Mises distribution.

Since the gaze vectors can be in three-dimensions, it will be appreciated that the probability distribution function can be a three-dimensional probability distribution that defines a confidence cone, with an apex that is at the gaze origin. Such a function defines the probability of the user's gaze being along the axis of the cone for a given angular offset from the axis of the cone for a gaze vector. If a gaze vector is aligned with the axis of the cone, then it has a maximum probability value of being aligned with the user's actual gaze. If a gaze vector is offset from the axis of the cone, then the probability that the user's gaze is actually aligned with the axis of the cone reduces as the size of the offset increases.

Although the von Mises distribution is described above, in other examples one of the following probability distribution functions can be used instead to define a probability value for a given angle 563, 564 between a respective one of the left and right gaze vectors 551, 554 and a line from the corresponding eye origin 552, 555 through the candidate convergence point 562*a*:

a monotonically decreasing function;

a normal distribution function, which can be centred on the respective one of the left and right gaze vectors 551, 554 such that it has a maximum value for an angle of zero).

However, it has been found that using only angle-based probability distributions can result in some inaccuracies in the calculated convergence distance. More particularly, by modelling only the distribution of the angle deviation it has been found that there are cases where there is a continuous region along the combined gaze vector where the combined confidence from the left and right confidence cones is constant and maximized. In this region, the confidences from each cone complement each other. This is because the angle with respect to one cone reduces as the angle with respect to the other cone increases.

Figure 6A:
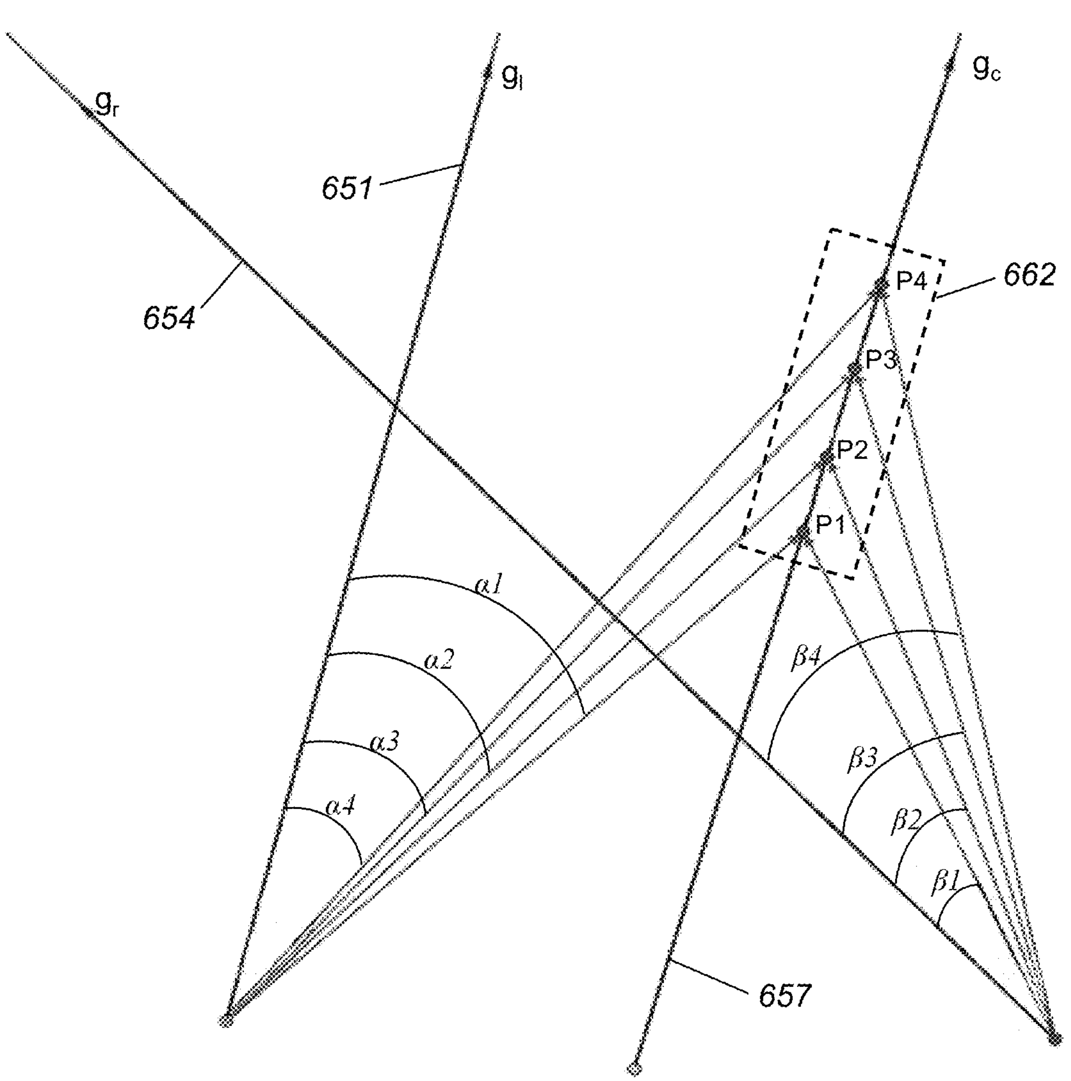
FIG. 6*a* illustrates how a region of candidate convergence points could have a constant combined confidence when the confidence is based only on angles.

FIG. 6*a* illustrates how a region of candidate convergence points 662 could have a constant combined confidence when the confidence is based only on angles. The figure shows an exaggerated divergence between the left gaze vector 651 and the right gaze vector 654 in to assist with the clarity of the explanation.

The figure shows a left gaze vector ($g_l$) 651, a right gaze vector ($g_r$) 654 and a combined gaze vector ($g_c$) 657. We consider the combined confidence at points ($P_1$, $P_2$, $P_3$, $P_4$) on the combined gaze vector 657. The left and right gaze vectors 651, 654 to these points subtend the angles indicated in the figure such that $$\alpha_1 > \alpha_2 > \alpha_3 > \alpha_4 \text{ and } \beta_1 < \beta_2 < \beta_3 < \beta_4$$

If we consider a probability distribution based only on angle, then the corresponding probabilities have the same relationship. That is, $$P(\alpha_1) < P(\alpha_2) < P(\alpha_3) < P(\alpha_4) \text{ and } P(\beta_1) > P(\beta_2) > P(\beta_3) > P(\beta_4)$$

Then it is possible that probability distributions for the left and right confidence cones can result in the combined probabilities for these points being equal. I.e., $$P(\alpha_1) * P(\beta_1) = P(\alpha_2) * P(\beta_2) = P(\alpha_3) * P(\beta_3) = P(\alpha_4) * P(\beta_4)$$

Figure 6B:
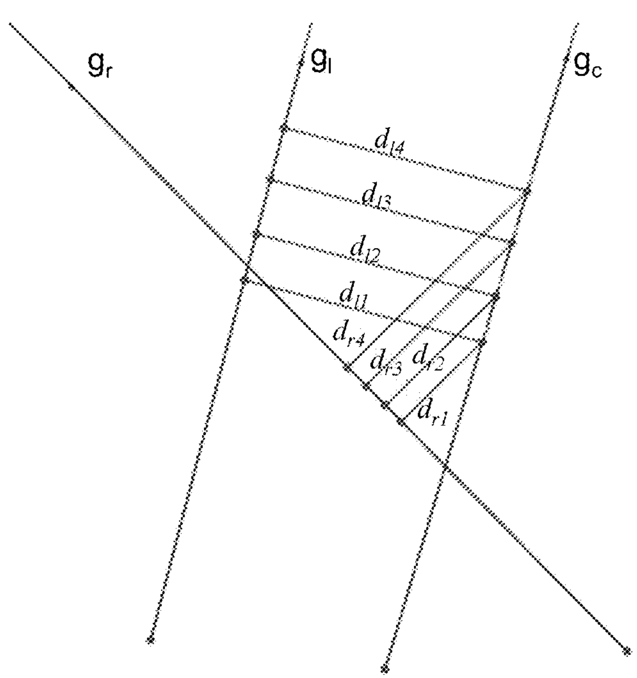
FIG. 6*b* shows the same vectors and candidate convergence points as FIG. 6*a* along with the shortest distance between each of the left and right gaze vectors and the candidate convergence points.

However, as will now be described, it has been found that if we include the distances from each of these points ($P_1$, $P_2$, $P_3$, $P_4$) to the left and right gaze vectors 651, 654 (in this example the shortest distances), then it is less likely that the distances, and therefore any probabilities based on the distances, will share a similar relationship. This is shown by FIG. 6*b*, which shows the same vectors and candidate convergence points as FIG. 6*a*. In FIG. 6*b*, the shortest distance between each of the left and right gaze vectors 651, 654 and the candidate convergence points ($P_1$, $P_2$, $P_3$, $P_4$) are labelled.

An exception can occur if the left and right gaze vectors 651, 654 are perfectly parallel. In which case, the convergence distance is at infinity. However, this can be handled by the controller as a unique corner case. For example, if the controller determines that the left and right gaze vectors 651, 654 are parallel with each other, then it can automatically set the convergence distance as a predetermined value. Such a predetermined value may be a maximum value allowed by an application that will use the convergence distance.

Returning to FIG. 5*c*, examples described herein therefore include a distance term in the probability distributions. In this example the distance term is based on the shortest distance from the candidate convergence point P to the individual gaze vectors 551, 554 (although as indicated above, it is not essential to use the shortest distances). In FIG. 5*c*, the distance 565 between the left gaze vector 551 and the candidate convergence point 562*a* will be referred to as $d_l$. The distance 566 between the right gaze vector 554 and the candidate convergence point 562*a* will be referred to as $d_r$. Therefore, we formulate this modified probability distribution based on angle and distance. Let this function be $h(\alpha, d)$.

Then the combined probability distribution is:

$$f(P) = h_l(\alpha_l, d_l) * h_r(\alpha_r, d_r)$$

In this example, the distance-based term for the probability distribution we use is $$P(d) = e^{-dC_d}$$

Where d is the shortest distance to the associated left or right gaze vector, and $C_d$ is a constant, which can be manually tuned during a calibration routine.

Combining this with the probability distribution based on angle deviation a gives $$P(\alpha, d) = P(\alpha) * P(d) = V(\alpha) * e^{-dC_d}$$

Where V is the von Mises distribution described above.

In this way, the controller calculates the probability that the candidate convergence point 562*a* is at the gaze convergence based on:

- the application of a monotonically decreasing probability distribution function to the distance $d_l$ between the left gaze vector 551 and the candidate convergence point 562*a*; and
- the application of a monotonically decreasing probability distribution function to the distance $d_r$ between the right gaze vector 564 and the candidate convergence point 562*a*.

In this example, the monotonically decreasing function is an exponential function raised to the power of d, where d is distance between the candidate convergence point 562*a* and the respective one of the left gaze vector 551 and the right gaze vector 554. An exponential function is a convenient function because it provides a value of 1 (to represent a maximum probability value) when the distance d is zero. In other examples, the probability distribution function that is applied to the distance between the left or right gaze vector 561, 564 and the candidate convergence point 562 could be a normal distribution or any other suitable function.

Figure 7:
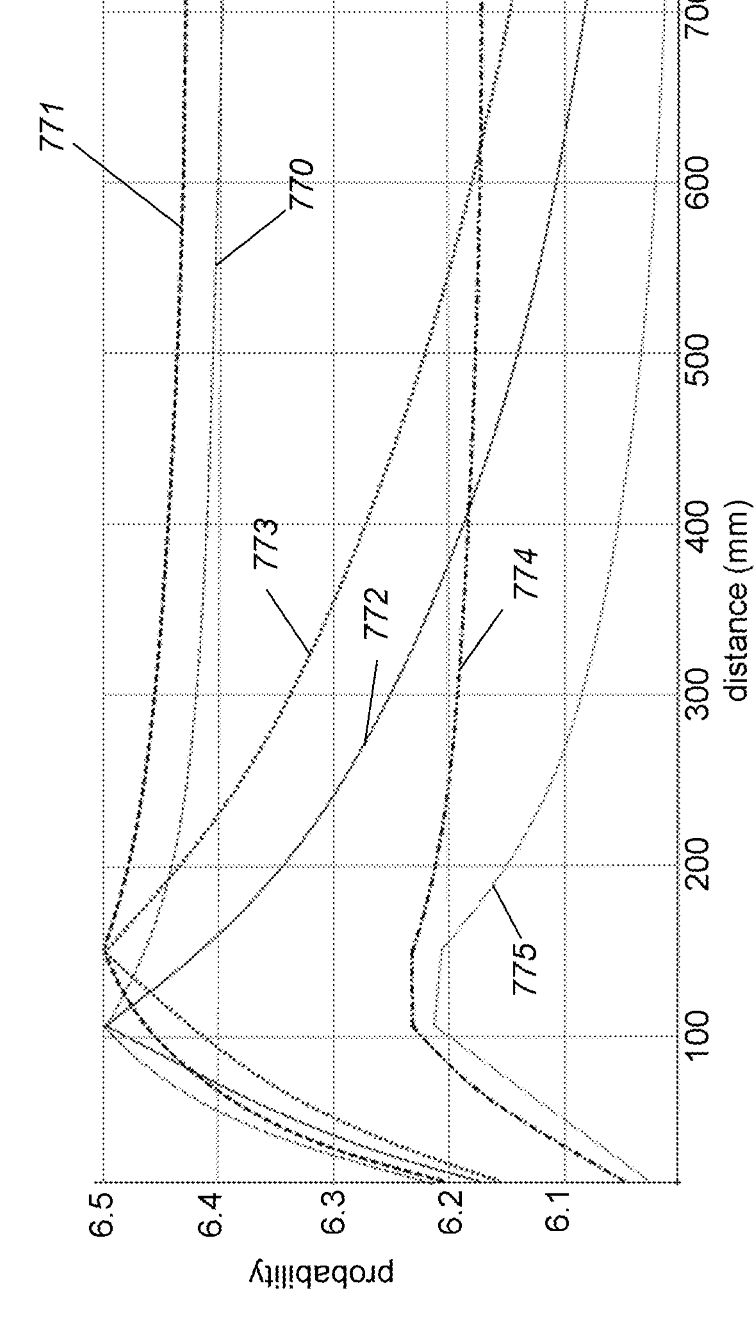
FIG. 7 shows some simulation results for an example eye tracking system of the present disclosure.

FIG. 7 shows some simulation results for an example eye tracking system of the present disclosure. The horizontal axis represents the distance of the candidate convergence point from the combined gaze origin. The vertical axis represents the probability of that point being the convergence point. The peak of each of the plots that are shown in FIG. 7 indicate the most likely convergence distance for the information that is represented by that plot.

The simulation results are for the following set of signals:

- a left gaze signal having a left eye origin of [30 0 0] and a left gaze vector/direction of [−70 0 250];
- a right gaze signal having a right eye origin of [−30 0 0] and a right gaze vector/direction of [50 0 250]; and
- a combined gaze signal having a combined eye origin of [0 0 0] and a combined gaze vector/direction of [0 0 21];

FIG. 7 shows plots of probability versus convergence distance based on:

only the angle between the left gaze vector and a line from the left eye origin through the candidate convergence point (plot 770);

only the angle between the right gaze vector and a line from the right eye origin through the candidate convergence point (plot 771);

both: the distance between the left gaze vector and the candidate convergence point; and the angle between the left gaze vector and a line from the left eye origin through the candidate convergence point (plot 772);

both: the distance between the right gaze vector and the candidate convergence point; and the angle between the right gaze vector and a line from the right eye origin through the candidate convergence point (plot 773);

a combination of only the angles for the left and right gaze vectors (plot 774); and a combination of the angles and the distances for the left and right gaze vectors (plot 775).

By constructing this test case in simulation, a case can be produced with a region of constant probability when using a probability function only based on angles. This can be seen by the plateau in plot 774 at about 100-200 mm, which is parallel with the horizontal axis and represents a plurality of convergence distances that are each equally likely to be the real convergence distance. However, plot 775 shows that using a probability function based on both angles and distances produces a single point of maximum probability at about 100 mm. That is, the flat region that can be seen in plot 775 is no longer parallel with the horizontal axis such that, in this example, it has a maximum value at the start of the flat region. Therefore, using probability functions for the angles and distances together resolves the ambiguity that arises when probability functions for only the angles are used.

Figure 8:
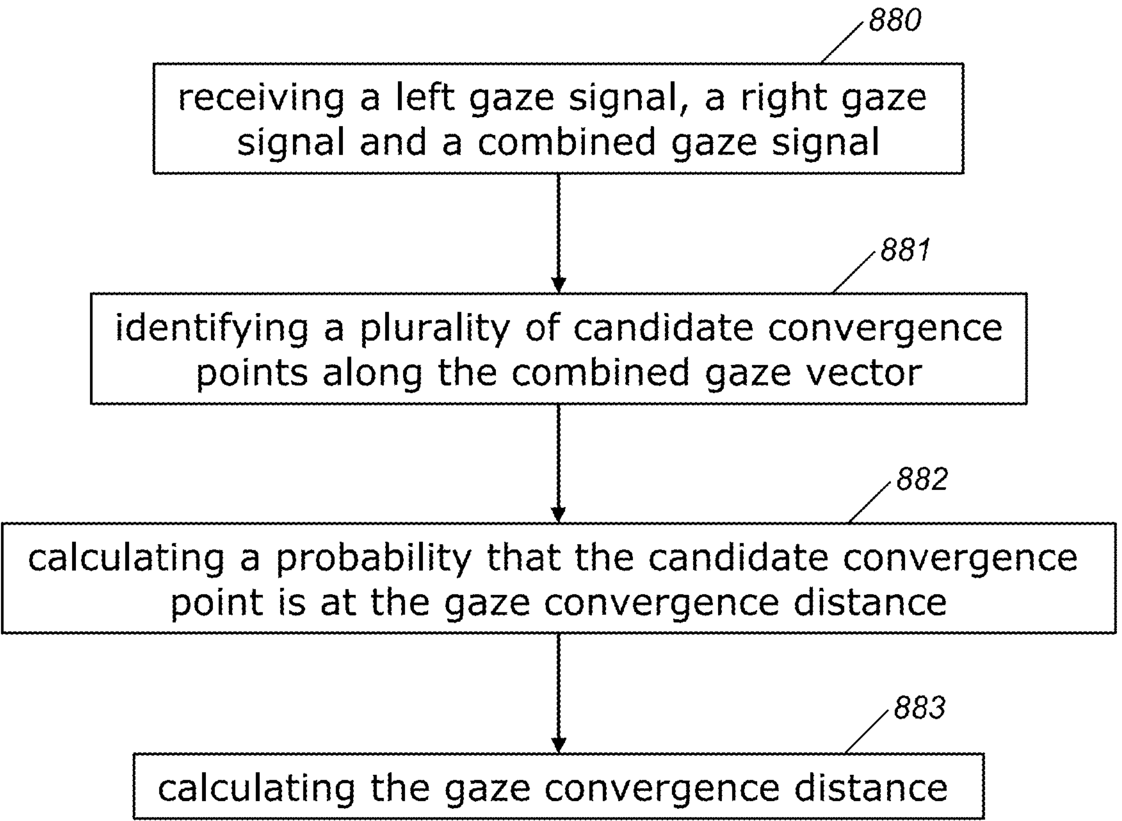
FIG. 8 shows an example embodiment of a method for determining a gaze convergence distance for a user of an eye tracking system.

FIG. 8 shows an example embodiment of a method for determining a gaze convergence distance for a user of an eye tracking system.

At step 880, the method involves receiving a left gaze signal, a right gaze signal and a combined gaze signal. As discussed above: the left gaze signal represents a left gaze vector from a left eye origin; the right gaze signal represents a right gaze vector from a right eye origin; and the combined gaze signal represents a determined combined gaze vector.

At step 881, the method involves identifying a plurality of candidate convergence points along the combined gaze vector. Then at step 882, for each candidate convergence point, the method involves calculating a probability that the candidate convergence point is at the gaze convergence distance. As discussed above, calculating this probability is based on:

a) the angle between the left gaze vector and a line from the left eye origin through the candidate convergence point;

b) the angle between the right gaze vector and a line from the right eye origin through the candidate convergence point;

c) the distance between the left gaze vector and the candidate convergence point; and d) the distance between the right gaze vector and the candidate convergence point.

Then at step 883, the method involves calculating the gaze convergence distance based on the candidate convergence point that has the highest probability.

Once the gaze convergence distance has been determined, the method can continue by using the determined gaze convergence distance to control the focal length of a varifocal lens of the eye tracking system. For example: a voltage can be applied to an electrically controlled varifocal lens; or a mechanical actuator can be activated to move the lens and change the position of the associated focal plane. In this way, the eye tracking system can be automatically controlled to improve the viewing experience of the user. Such functionality can be especially useful in extended reality systems, such as augmented and virtual reality systems.

Additionally, or alternatively, the determined gaze convergence distance can be used by the eye tracking system as part of an algorithm to identify more accurately which of a plurality of selectable objects the user is looking at. This can involve the method presenting a plurality of selectable objects to the user on one or more display screen; each of which are at a known object distance from the user and are at a known location in the one or more display screens. The method can determine a gaze angle for the user at the same time as the images of the user's left and right eyes are captured, and then use the determined gaze convergence distance in combination with the determined gaze angle to identify one of the selectable objects as a selected object. For example, a cost function can be applied that looks to minimize the differences between: i) the known object distance for each selectable object and the determined gaze convergence distance; and ii) the known location in the display screen for each selectable object and the determined gaze angle. In this way, determined gaze convergence distance is used to complement the determined gaze angle as part of an eye tracking operation.

The invention claimed is:

1. A method for determining a gaze convergence distance for a user of an eye tracking system, the method comprising:

receiving:

a left gaze signal, which represents a left gaze vector from a left eye origin;

a right gaze signal, which represents a right gaze vector from a right eye origin;

a combined gaze signal, which represents a determined combined gaze vector;

identifying a plurality of candidate convergence points along the combined gaze vector;

for each candidate convergence point, calculating a probability that the candidate convergence point is at the gaze convergence distance based on:

a) the angle between the left gaze vector and a line from the left eye origin through the candidate convergence point;

b) the angle between the right gaze vector and a line from the right eye origin through the candidate convergence point;

c) the distance between the left gaze vector and the candidate convergence point; and d) the distance between the right gaze vector and the candidate convergence point; and calculating the gaze convergence distance based on the candidate convergence point that has the highest probability.

2. The method of claim 1, wherein calculating the probability that each candidate convergence point is at the gaze convergence is based on:

a) the application of a probability distribution function to the angle between the left gaze vector and a line from the left eye origin through the candidate convergence point; and b) the application of a probability distribution function to the angle between the right gaze vector and a line from the right eye origin through the candidate convergence point.

3. The method of claim 2, wherein calculating the probability that each candidate convergence point is at the gaze convergence is based on:

a) the application of one of the following probability distribution functions to the angle between the left gaze vector and a line from the left eye origin through the candidate convergence point: a monotonically decreasing function, a normal distribution function, and a von Mises function; and b) the application of one of the following probability distribution functions to the angle between the right gaze vector and a line from the right eye origin through the candidate convergence point: a monotonically decreasing function, a normal distribution function, and a von Mises function.

4. The method of claim 2, wherein calculating the probability that each candidate convergence point is at the gaze convergence is based on:

a) the application of a three-dimensional probability distribution function to the angle between the left gaze vector and a line from the left eye origin through the candidate convergence point; and b) the application of a three-dimensional probability distribution function to the angle between the right gaze vector and a line from the right eye origin through the candidate convergence point.

5. The method of claim 1, wherein calculating the probability that each candidate convergence point is at the gaze convergence is based on:

c) the application of a probability distribution function to the distance between the left gaze vector and the candidate convergence point; and d) the application of a probability distribution function to the distance between the right gaze vector and the candidate convergence point.

6. The method of claim 5, wherein calculating the probability that each candidate convergence point is at the gaze convergence is based on:

c) the application of a monotonically decreasing probability distribution function to the distance between the left gaze vector and the candidate convergence point; and d) the application of a monotonically decreasing probability distribution function to the distance between the right gaze vector and the candidate convergence point.

7. The method of claim 6, wherein:

the monotonically decreasing function that is applied for the left gaze vector is an exponential function raised to the power of d, where d is distance between the left gaze vector and the candidate convergence point; and the monotonically decreasing function that is applied for the right gaze vector is an exponential function raised to the power of d, where d is distance between the right gaze vector and the candidate convergence point.

8. The method of claim 7, wherein calculating the probability that each candidate convergence point is at the gaze convergence is based on:

c) a Euclidian or a Minkowski distance between the left gaze vector and the candidate convergence point; and d) a Euclidian or a Minkowski distance between the right gaze vector and the candidate convergence point.

9. The method of claim 1, further comprising:

using the determined gaze convergence distance to control the focal length of a varifocal lens of the eye tracking system.

10. The method of claim 1, further comprising:

presenting a plurality of selectable objects to the user on one or more display screens, wherein each of the plurality of selectable objects is at a known object distance from the user and is at a known location on the one or more display screens;

determining a gaze angle for the user at the same time as images of the user's left and right eyes are captured; and using the calculated gaze convergence distance in combination with the determined gaze angle to identify one of the selectable objects as a selected object.

11. The method of claim 1, further comprising, prior to receiving the combined gaze signal, the left gaze signal, and the right gaze signal:

presenting a plurality of calibration objects to the user on one or more display screens, wherein the plurality of calibration objects is at known locations on the one or more display screens;

while the plurality of calibration objects is being presented:

capturing calibration images of the user's left eye and determining calibration left gaze signals that each represent a left gaze vector and a left eye origin for the user's left eye based on the captured calibration images of the user's left eye;

capturing calibration images of the user's right eye and determining calibration right gaze signals that each represent a right gaze vector and a right eye origin for the user's right eye based on the captured calibration images of the user's right eye;

determining:

one or more parameters of a probability distribution function for the user's left eye based on pairs of: i) a determined calibration left gaze signal; and ii) the known location of the calibration object that is displayed on the one or more display screens at the same time that the calibration image associated with the determined calibration left gaze signal was captured; and one or more parameters of a probability distribution function for the user's right eye based on pairs of: i) a determined calibration right gaze signal; and ii) the known location of the calibration object that is displayed on the one or more display screens at the same time that the calibration image associated with the determined calibration right gaze signal was captured.

12. An eye tracking system comprising:

an image sensor for capturing images of the eyes of the user;

one or more illuminators for illuminating the eyes of a user;

one or more controllers;

wherein the eye tracking system is configured to:

receive:

a left gaze signal, which represents a left gaze vector from a left eye origin;

a right gaze signal, which represents a right gaze vector from a right eye origin;

a combined gaze signal, which represents a determined combined gaze vector;

identify a plurality of candidate convergence points along the combined gaze vector;

for each candidate convergence point, calculate a probability that the candidate convergence point is at the gaze convergence distance based on:

a) the angle between the left gaze vector and a line from the left eye origin through the candidate convergence point;

b) the angle between the right gaze vector and a line from the right eye origin through the candidate convergence point;

c) the distance between the left gaze vector and the candidate convergence point; and d) the distance between the right gaze vector and the candidate convergence point; and calculate the gaze convergence distance based on the candidate convergence point that has the highest probability.

13. The eye tracking system of claim 12, wherein calculating the probability that each candidate convergence point is at the gaze convergence is based on:

a) the application of a probability distribution function to the angle between the left gaze vector and a line from the left eye origin through the candidate convergence point; and b) the application of a probability distribution function to the angle between the right gaze vector and a line from the right eye origin through the candidate convergence point.

14. The eye tracking system of claim 12, wherein calculating the probability that each candidate convergence point is at the gaze convergence is based on:

a) the application of one of the following probability distribution functions to the angle between the left gaze vector and a line from the left eye origin through the candidate convergence point: a monotonically decreasing function, a normal distribution function, and a von Mises function; and b) the application of one of the following probability distribution functions to the angle between the right gaze vector and a line from the right eye origin through the candidate convergence point: a monotonically decreasing function, a normal distribution function, and a von Mises function.

15. The eye tracking system of claim 12, wherein calculating the probability that each candidate convergence point is at the gaze convergence is based on:

c) the application of a probability distribution function to the distance between the left gaze vector and the candidate convergence point; and d) the application of a probability distribution function to the distance between the right gaze vector and the candidate convergence point.

16. The eye tracking system of claim 15, wherein calculating the probability that each candidate convergence point is at the gaze convergence is based on:

c) the application of a monotonically decreasing probability distribution function to the distance between the left gaze vector and the candidate convergence point; and d) the application of a monotonically decreasing probability distribution function to the distance between the right gaze vector and the candidate convergence point.

17. The eye tracking system of claim 12, the eye tracking system further configured to:

use the determined gaze convergence distance to control the focal length of a varifocal lens of the eye tracking system.

18. The eye tracking system of claim 12, the eye tracking system further configured to:

present a plurality of selectable objects to the user on one or more display screens, wherein each of the plurality of selectable objects is at a known object distance from the user and is at a known location on the one or more display screens;

determine a gaze angle for the user at the same time as images of the user's left and right eyes are captured; and use the calculated gaze convergence distance in combination with the determined gaze angle to identify one of the selectable objects as a selected object.

19. The eye tracking system of claim 12, wherein the eye tracking system is a head-mounted eye tracking system.

20. The eye tracking system of claim 12, wherein the eye tracking system is an extended reality system.

* * * * *